United States Patent [19]
Jordan

[11] Patent Number: 5,647,606
[45] Date of Patent: Jul. 15, 1997

[54] SUSPENSION ALIGNMENT DEVICE

[76] Inventor: Mark P. Jordan, 7A Turf Ct., Clifton Park, N.Y. 12065

[21] Appl. No.: 749,974

[22] Filed: Aug. 26, 1991

[51] Int. Cl.$^6$ ............................................. B62D 17/00
[52] U.S. Cl. .................................................... 280/661
[58] Field of Search ............................ 280/661; 403/92, 403/116; 411/399, 539, 540, 541; 74/89.18, 89.19

[56] References Cited

U.S. PATENT DOCUMENTS

| | | | |
|---|---|---|---|
| 1,936,769 | 11/1933 | Olivet | 411/399 |
| 2,406,098 | 8/1946 | Musgrave et al. | 74/89.19 |
| 4,420,170 | 12/1983 | Wysocki | 280/661 |
| 4,479,734 | 10/1984 | Rother | 403/4 |
| 4,619,465 | 10/1986 | Johnson | 280/661 |
| 4,797,022 | 1/1989 | Crigger | 411/399 |
| 4,953,894 | 9/1990 | Broszat et al. | 280/661 |

FOREIGN PATENT DOCUMENTS

| | | | |
|---|---|---|---|
| 3820642 | 12/1989 | German Dem. Rep. | 280/661 |
| 455094 | 1/1928 | Germany | 280/661 |
| 1024346 | 6/1983 | U.S.S.R. | 280/661 |

*Primary Examiner*—Christopher P. Ellis
*Attorney, Agent, or Firm*—Kevin R. Kepner

[57] ABSTRACT

An alignment adjusting device for an independently suspended vehicle wheel particularly useful for MacPherson strut type suspensions which consists of a geared slotted member which reacts with either a geared bolt or nut to allow quick and easy method to adjust camber. An additional embodiment provides a geared wedge which allows displacement of the camber. The device can be installed with minimal modifications to the vehicle or can be manufactured into vehicles and allows the alignment technician to adjust the camber without the need to remove the alignment instrumentation.

5 Claims, 6 Drawing Sheets

SUSPENSION ALIGNMENT DEVICE

This invention relates to wheel alignment adjusting devices and, more particularly, to a camber and or caster adjusting device for vehicles with independently suspended wheels. Conventional alignment adjusting devices used for adjusting camber, caster, and toe for independently suspended wheels are found in various prior U.S. Patents. The following patents use either some variation of an eccentric element to obtain the desired alignment adjustment or in the case of the Jordan Patent a pivoting type element.

U.S. Pat. No. 3,526,413 to Muller discloses a camber and caster adjusting device including eccentric elements arranged in the joints of guide members which support the wheel as in what is typically referred to as an A-frame type suspension.

U.S. Pat. No. 3,917,308 to Schultz discloses a camber and toe adjusting device for strut-type suspensions utilizing through bolt fasteners holding a clamping bracket on the strut lower end to the neck portion of a wheel support knuckle. An eccentric element is located on one bolt and trapped between guide surfaces on the holding clamp. The eccentric element is rotatably adjustable to force the clamp and knuckle angularly to varying camber relationships.

The U.S. Pat. No. 4,313,617 to Muramutsu et al. discloses a camber adjusting device including an an eccentric adjustment piece rotatably provided on the steering knuckle. Rotation of the piece causes the strut support bracket to be displaced about the knuckle by a valve of eccentricity of the piece whereby the strut is displaced with respect to the steering knuckle adjusting the camber angle.

The U.S. Pat. No. 4,424,984 to Shiratori et al. discloses a camber adjusting device including a hollow shaft with a disk-shaped cam disposed at one end and a non round fit portion on the other end, an engaging member having a non round hole into which the fit portion of the hollow is inserted and having a cam surface with a profile the same as the end of the hollow shaft, and a bolt which hollow tube is oscillatably supporting a suspension arm by insertion into slots in the fixed supporting member. The bolt is inserted through the hollow tube and into the engaging member, rotation of the engaging member cause a relative displacement of the tube within the mounting slots.

The U.S. Pat No. 4,577,534 to Rayne discloses an eccentric cam socket tool which, when engaged with the nut of a through bolt fastener on the strut lower end and related, allows camber adjustment to be obtained.

Pending application Ser. No. 7/226,618 by Jordan discloses a camber adjusting device which consists of a one-piece nut-washer combination which is rotatably adjustable that allows a quick and easy method to adjust camber.

All of the above mentioned require some surface or shoulder area upon which to react to provide the desired adjustment to be obtained. None of the above mentioned devices allow for adjustment of camber for suspensions on which there is not a raised shoulder or flange upon which the eccentric element can react.

Many automobiles are now being manufactured without the shoulder or flange on the suspension and also many are being manufactured with no built in means of camber or caster adjustment at all. This results in automobile owners being required to frequently replace expensive parts or pay for laboreous bending procedures to achieve a simple and complete wheel alignment. There is currently a patent issued which attempts to address this problem. The U.S. Pat. No. 4,706,987 to Pettibone discloses a camber adjusting device which utilizes an eccentric bolt element in combination with a bracket having parallel flanged surfaces upon which the eccentric element is rotably adjustable, thereby providing a means for camber adjustment. In practice however, it is usually the bracket which is displaced rather than the camber adjustment and the use of the invention in many instances requires the removal of the wheels of the auto, the removal of the alignment equipment and often requires modification of the actual strut flange.

The Jordan patent, U.S. Pat. No. 4,971,352 uses a pivoting nut or nut/washer device in combination with a narrowed bolt to achieve the desired horizontal displacement to effect a camber adjustment.

With the introduction of robotic alignment onto the assembly lines of automobile manufacturers many built in alignment adjusters, particularly eccentric cambolts had to be eliminated as an original equipment part of the suspension unit because the eccentrics actually interferred with the robotic equipment designed to adjust the camber, caster and toe of an automobile.

One attempt to overcome this problem was with the use of oval eccentric undersized cambolts on some models which allowed toe high speed robotic rear tor adjustment on the assembly line however it performed poorly and erratically in the field when re-alignment was attempted. Though the suspension design is still being manufactured today, the undersized oval cambolt has been discontinued as a component of suspension.

Another attempt to speed production particularly but not specifically with MacPherson strut suspensions was to eliminate the use of a camber adjustment slot or camber and caster adjustment slots all together in the suspension design. It is believed that if the suspension parts were built and assembled identically and repeatedly that proper camber and caster angles could be duplicated within reasonable tolerances. This idea has been quite successful although the actual tolerances had to increased to accommodate this procedure and is being used more and more every year. This biggest disadvantage of this method of manufacturing is that re-alignment of these vehicles has become a very time consuming and expensive ordeal to the automobile owner.

SUMMARY OF INVENTION

It is an object of present invention to provide an effective, inexpensive and easily factory or aftermarket installed device for the adjustment of the suspension to which it is applied thus overcoming the disadvantages of prior art described above.

It is an additional advantage of this invention that in its factory installed mode and in some applications as an after-market item it can be installed without removing the wheel alignment equipment or the wheel of the vehicle upon which it is being installed. This enables the technician making the adjustment to perform the entire alignment adjustment without the necessity of multiple equipment hook-ups.

BRIEF DESCRIPTION OF THE DRAWINGS

FIG. 2a is a sectional view along line C—C' of FIG. 1a.

DESCRIPTION OF THE PREFERRED EMBODIMENTS

Figure 1:
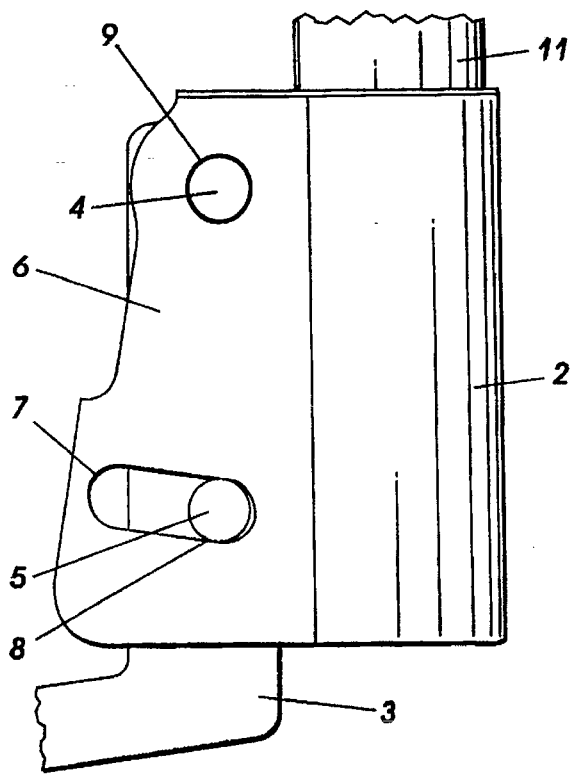
FIG. 1 is a side view showing a typical example of the slotted clamp arrangement at the lower end of a strut in a strut-type suspension.

With reference to FIG. 1, it is seen that the front wheel of a motor vehicle is coupled to the vehicle frame or structure by means of a MacPherson strut member 1, a clampable mounting link 2 and a wheel support member 3 or steering knuckle. The clampable mounting link 2 is generally a U-shaped member and is attached around the lower end of the strut member 1, the wheel support member is then retained by means of two through bolts 4 and 5 which pass through the legs 6 of the mounting link between which the support member 3 is positioned. A lower mounting hole 8 in the support member 3 is positioned in vertical alignment with the upper mounting hole 9. Lower holes 7 in the mounting link legs 6 are horizontal slots. In the preferred embodiment, the camber adjustment is robotically set at the factory and the clampable mounting link 2 is attached to the wheel support member by means of conventional hex head through bolts 4 and 5, and nuts. This is accomplished by the precise movement of the lower through bolt 5 in the lower mounting slots 7 which rotates the wheel support 3 about the pivot point of the upper mounting bolt 4 thereby achieving the desired camber setting.

To provide post assembly camber adjustment, it is generally necessary to loosen the upper 4 and lower 5 mounting bolts and to physically manipulate the wheel support 3 until the proper camber setting is obtained. This manipulation requires the presence of two persons and, due to the weight of the wheel components, it is difficult to maintain the proper setting once reached while the bolts are being tightened.

Figure 1A:
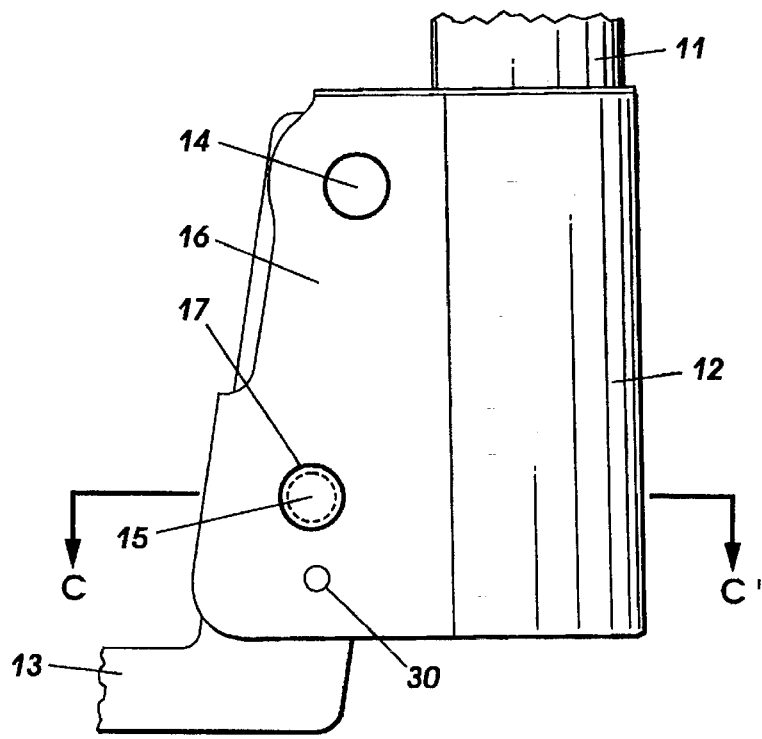
FIG. 1a is a side view showing a typical example of a non-slotted clamp arrangement at the lower end of a strut in a strut-type suspension.

FIG. 1a shows the same configuration of the strut member 11, clampable link 12, wheel support 13, upper 14 and lower 15 bolts, mounting link legs 16, and non-slotted lower mounting hole 17, which configuration is non-adjustable as it leaves the factory.

Figure 2:
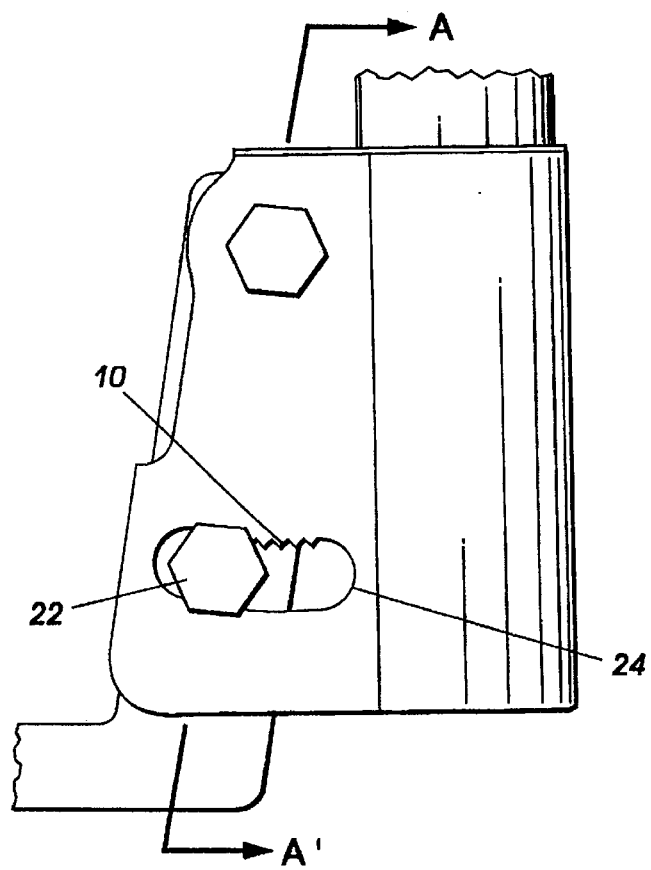
FIG. 2 is a side view showing a typical example of the slotted clamp arrangement at the lower end of a strut in a strut-type suspension with the present invention shown manufactured into the clamp.
Figure 4:
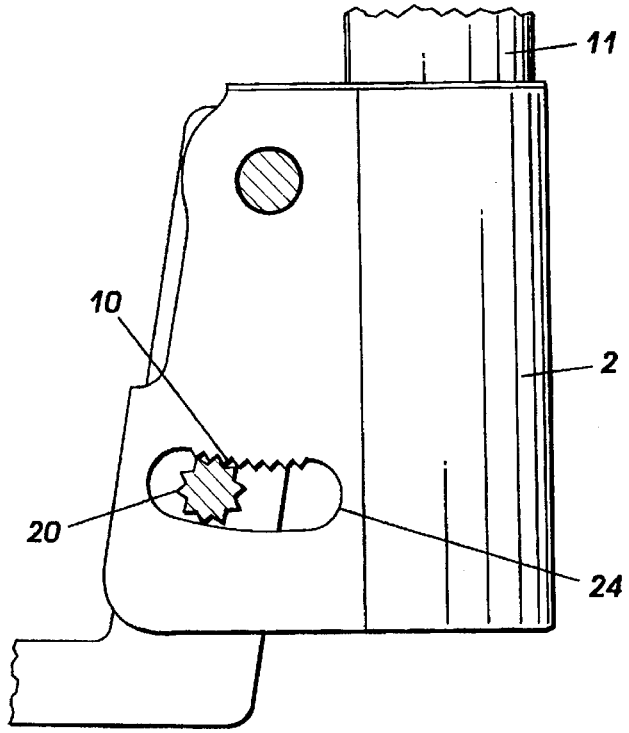
FIG. 4 is a sectional side view along line B—B' of FIG. 3.
Figure 5:
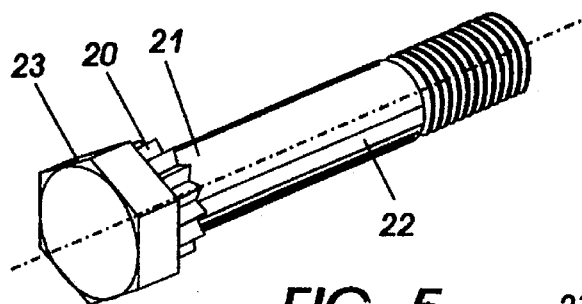
FIG. 5 is a perspective view of the geared bolt of the present invention for use with the slotted clamp.
Figure 6:
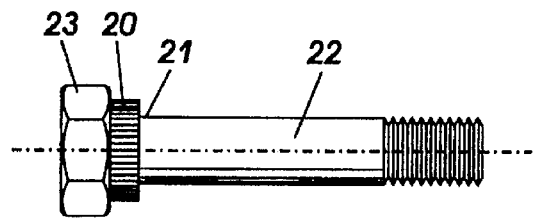
FIG. 6 is a side view of the geared bolt.
Figure 12:
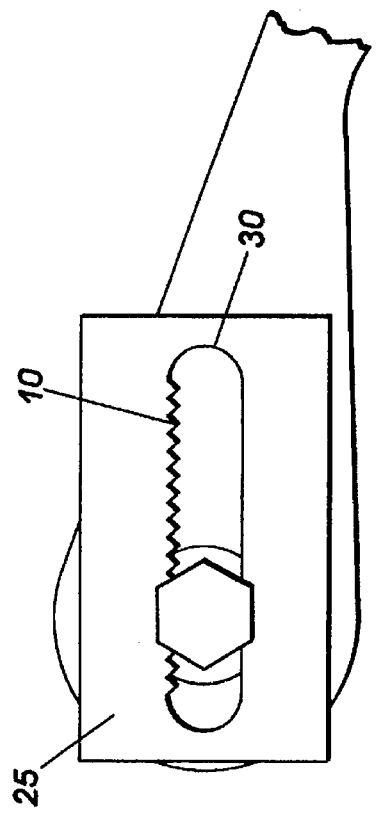
FIG. 12 is a side view of the slotted geared adapter plate of the present invention for use with non-slotted clamps.

As shown in FIGS. 2 and 4, the preferred embodiment provides a rack 10 and gear 20 adjusting element, which rack 10, as an aftermarket item, is detailed in FIG. 12, in the form of gear teeth 10 formed into the horizontal slot 24 which teeth 10 are adapted to fit gear teeth 20 formed into the shoulder 21 at the head end of a attachment bolt 22. As the bolt head 23 is turned the meshing of the rack 10 and gear 20 causes the bolt 22 to be horizontally displaced in the lower slot 24 until the proper camber setting is obtained. Once the proper setting is obtained, the adjusting device 20 can be held in position by means of a standard socket-type or open end wrench and the nut can be tightened from the nut side. This embodiment enables the proper post assembly camber setting to be obtained and the mounting bolts to be tightened by a single individual. A geared nut 27 can also be utilized with teeth 30 adapted to the teeth 10 in the horizontal slot 24 formed on one of the ends of the nut 27.

It is also within the scope of this invention to perform the camber adjustment by the horizontal displacement of the top mounting bolt with the pivot point located at the bottom bolt.

In a second embodiment of the invention shown in FIG. 1a the lower holes 17 in the mounting link legs 16 are round. In this embodiment, the camber adjustment is permanently set at the factory and the clampable mounting link 12 is attached to the wheel support member 13 by means of conventional hex head through bolts 14, and nuts. To provide post assembly camber adjustment, it is generally necessary to either replace various parts of the suspension or to perform laborious bending procedures on the parts to achieve the proper camber setting. This procedure is very expensive and requires disassembly of the suspension, wheels, etc..

Figure 2A:
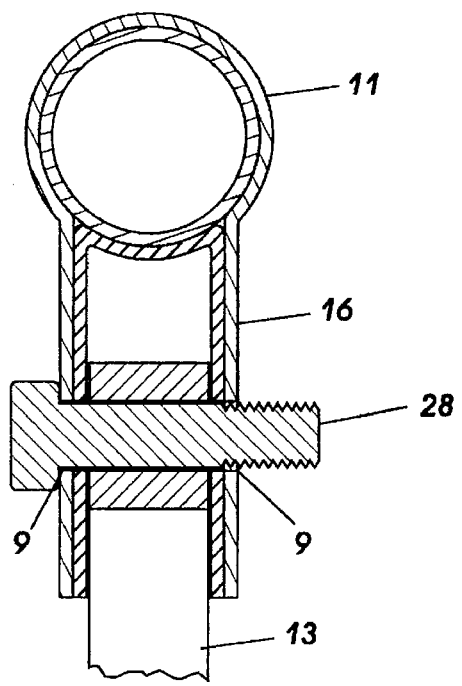
Figure 3:
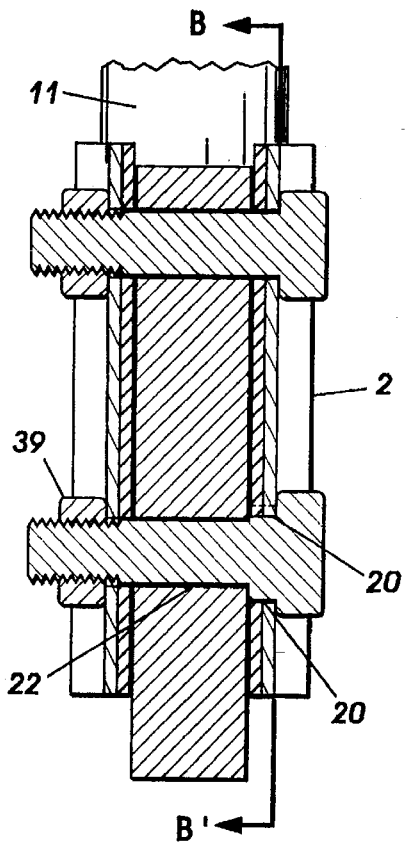
FIG. 3 is a sectional view along line A—A' of FIG. 2.
Figure 7:
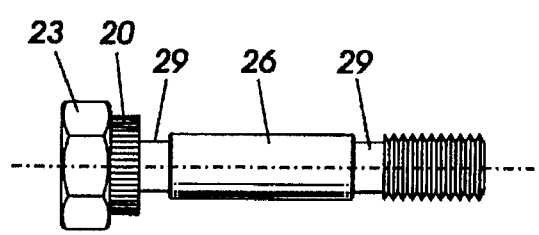
FIG. 7 is a side view of the geared bolt of the present invention for use with a non-slotted clamp.
Figure 8:
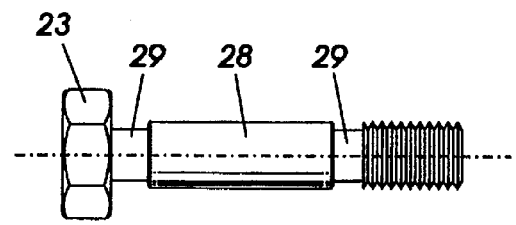
FIG. 8 is a cut down non-geared bolt for use with the geared nut of the present invention in a non-slotted clamp.
Figure 9:
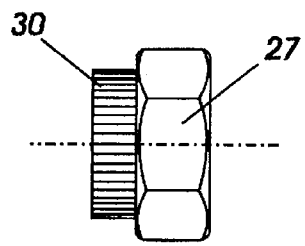
FIG. 9 is a side view of the geared nut of the present invention.
Figure 11:
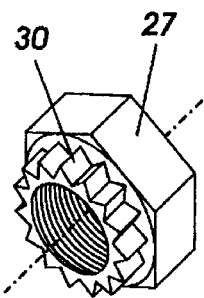
FIG. 11 is a perspective view of the geared nut.
Figure 10:
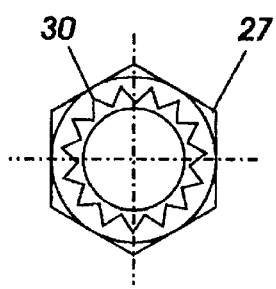
FIG. 10 is an end view of the geared nut.

As shown in FIG. 12, the preferred embodiment provides a geared adjusting element, which is comprised of a slotted geared plate 25 detailed in FIG. 12 and a geared bolt 26 (FIG. 7) or geared nut 27 (FIGS. 9 through 11) which replaces the standard nut, the slotted geared plate 25 which is adapted to fit on the strut flange 16, in addition, either a standard bolt 28 (FIG. 8) or a geared lower mounting bolt 26 (FIG. 7) is reduced in diameter to substantially the root diameter of the threads in the areas 29 on the bolt which coincide with the flange walls as shown in FIG. 2a. The geared bolt or nut is horizontially adjustable with regard to the slot which is fixedly attached to hole 30 drilled in the mounting link 12. As the device 26 or 27 is rotated, the modified mounting bolt 27 is displaced horizontally in the lower mounting hole 17, which displacement is allowed by virtue of the reduced diameter area 29 of the bolt, until the proper camber setting is obtained. Once the proper setting is obtained, the adjusting device 26 or 27 can be held in position by means of a standard socket-type or open end wrench and the modified bolt 28 can be tightened from the bolt-head side or the nut can be tightened when using the geared bolt 26. This embodiment enables the proper post assembly camber setting to be obtained and the mounting bolts to be tightened by a single individual.

It is also within the scope of this embodiment of the invention to perform the camber adjustment by the horizontal displacement of the top mounting bolt with the pivot point located at the bottom bolt.

Figure 13:
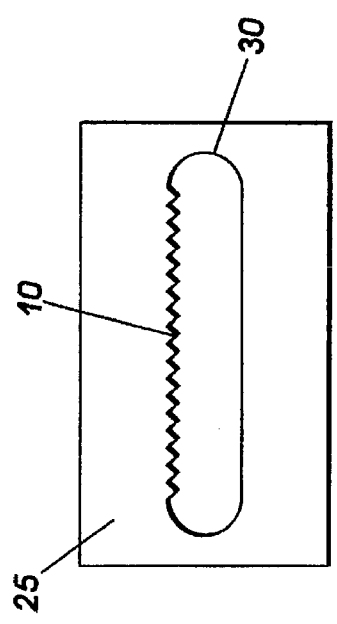
FIG. 13 is an example of the present invention for use with an A-frame type suspension.
Figure 14:
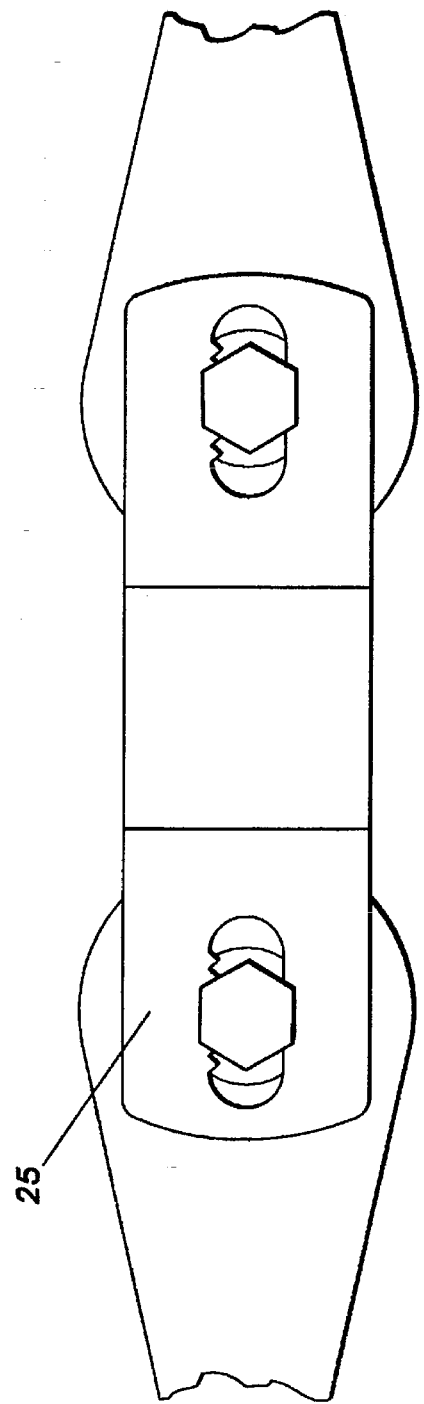
FIG. 14 is an example of the present invention for use with a strut-type rear suspension.

The rectangular slotted geared plate is also adaptable to aftermarket adjustment of various other types of independent suspensions including A-frame as shown in part in FIG. 13, and strut type rear suspensions as shown in FIG. 14. The rectangular plate can be utilized in instances where it is held in place between flanges on the suspension or by use of fasteners to attach the plate. It can further be utliized with a slotted mounting or with cut down bolts.

Figure 15:
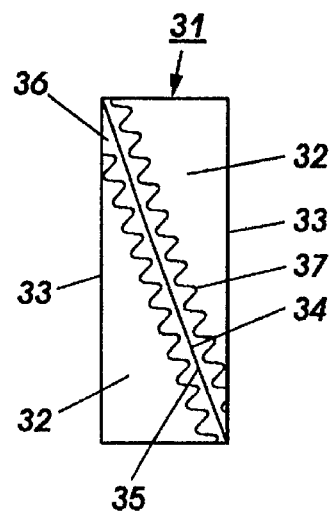
FIG. 15 is a side view of the geared wedge of the present invention.
Figure 17:
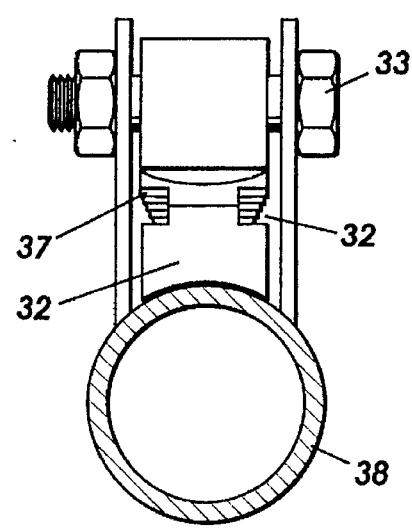
FIG. 17 is a top view of the installation of the geared wedge.
Figure 16:
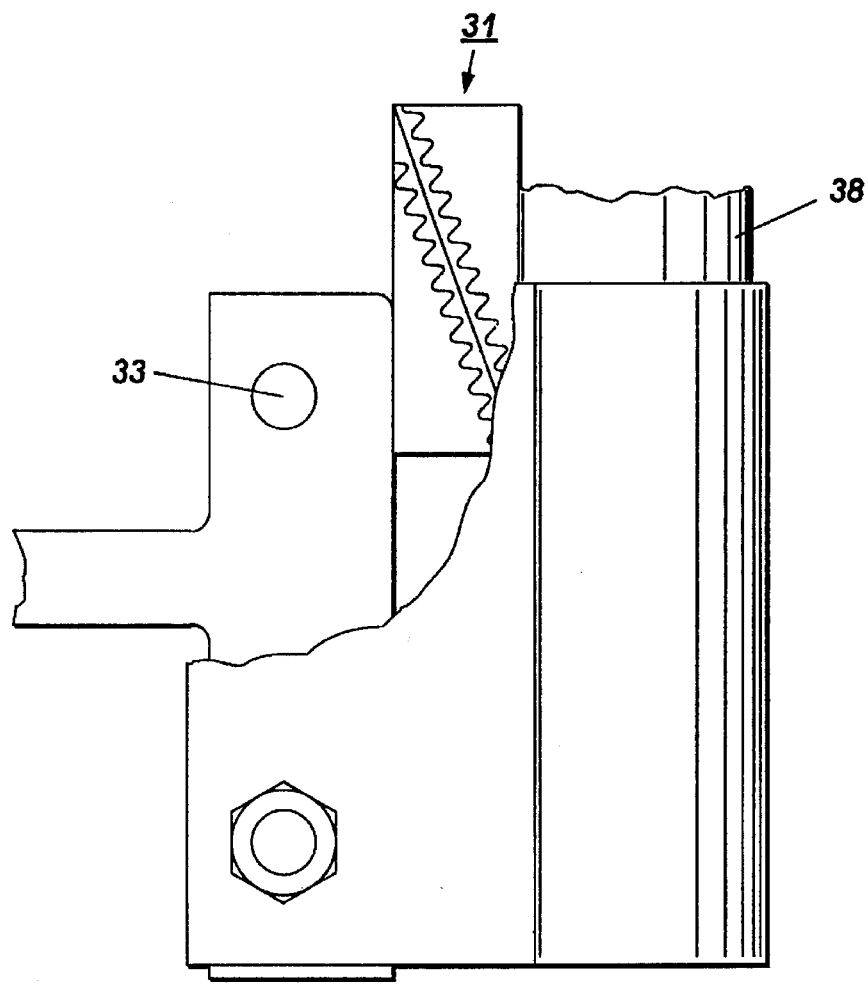
FIG. 16 is a side view with a partial cutaway showing the installation of the geared wedge of the present invention.

Another variation utilizing a gear driven device is shown in FIGS. 15 through 17. In this embodiment a wedge 31 is comprised of two substantially identical triangular sections 32 with the outside edges 33 parallel and non-parallel contacting surfaces 34 and 35. A channel 36 along the edge of the contacting surfaces with the gear teeth 37 formed into it allows the two wedge portions 32 to be slid in relation to each other causing a widening of the wedge 31. When the wedge 31 is placed between an upper attachment bolt 33 and the lower strut member 38 and the rack gears 37 driven by a star wrench, the upper bolt 33 is horizontally displaced to effect camber adjustment.

Although only several embodiments of the invention have been disclosed and described, it is readily apparant that other embodiments and modifications to various types of independent suspensions are possible without departing from the scope of this invention.

What is claimed is:

1. A device for adjusting the alignment of independently suspended wheels of a vehicle, said wheels supported on a vehicle frame by a link coupling means and a wheel support means comprising:

means for oscillatably supporting said wheel support means into a substantially round hole in said link coupling means, said link coupling means securedly fixed to said vehicle by a modified bolt means extending through said link coupling means and said wheel support means; and alignment adjustment means comprising a geared adjustment means rotatably adjustable in said link coupling means.

2. The device as claimed in claim 1 for adjusting the camber of a wheel of said vehicle wherein said geared adjustment means comprises said modified bolt means comprising a bolt with the diameter of said bolt reduced to substantially the root diameter of said bolt in the area on said bolt which aligns with said link coupling means, a plate fixedly secured to said link coupling means with a geared horizontal slot aligned with a attachment hole, and a nut with gear teeth adaptively fit to said geared horizontal slot disposed on an end of said nut adjacent to the link coupling means in a circular arrangement.

3. The device as claimed in claim 2 for adjusting the camber of a wheel of said vehicle wherein said link coupling means comprises lower strut flanges of a MacPherson strut means which is securedly fixed to said vehicle and an upper and lower set of substantially horizontal bores in said wheel support means corresponding to an upper bore and a lower bore in said strut flanges aligned with the said lower bore in said wheel support means, wherein said wheel support means comprises a steering knuckle.

4. The device as claimed in claim 1 for adjusting the camber of a wheel of said vehicle wherein said geared adjustment means comprises:

said modified bolt means comprising a bolt with the diameter of said bolt reduced to substantially the root diameter of said bolt in the area on said bolt which aligns with said link coupling means, wherein said bolt is formed with gear teeth disposed on the circumference of and integral to said bolt adjacent to the head of said bolt;

a plate fixedly secured to said link coupling means with a geared horizontal slot aligned with an attachment hole; and a nut.

5. The device as claimed in claim 4 for adjusting the camber of a wheel of said vehicle wherein said link coupling means comprises lower strut flanges of a MacPherson strut means which is securedly fixed to said vehicle and an upper and lower set of substantially horizontal bores in said wheel support means corresponding to an upper bore and a lower bore in said strut flanges aligned with the said lower bore in said wheel support means, wherein said wheel support means comprises a steering knuckle.

* * * * *